April 21, 1931.  F. V. DETWILER  1,802,005
COOKING APPARATUS
Filed Dec. 8, 1928   3 Sheets-Sheet 1
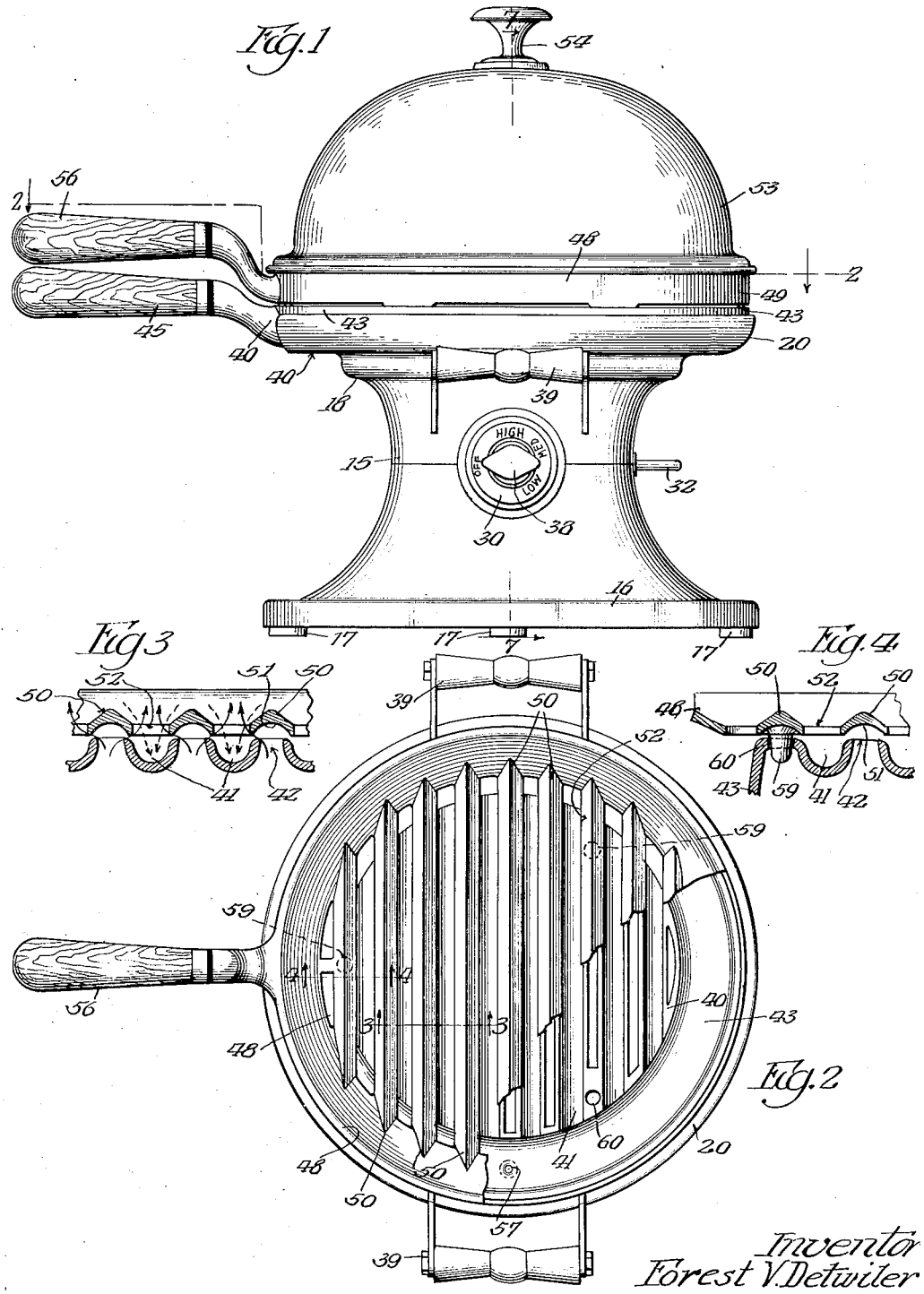

April 21, 1931.   F. V. DETWILER   1,802,005
COOKING APPARATUS
Filed Dec. 8, 1928     3 Sheets-Sheet 2
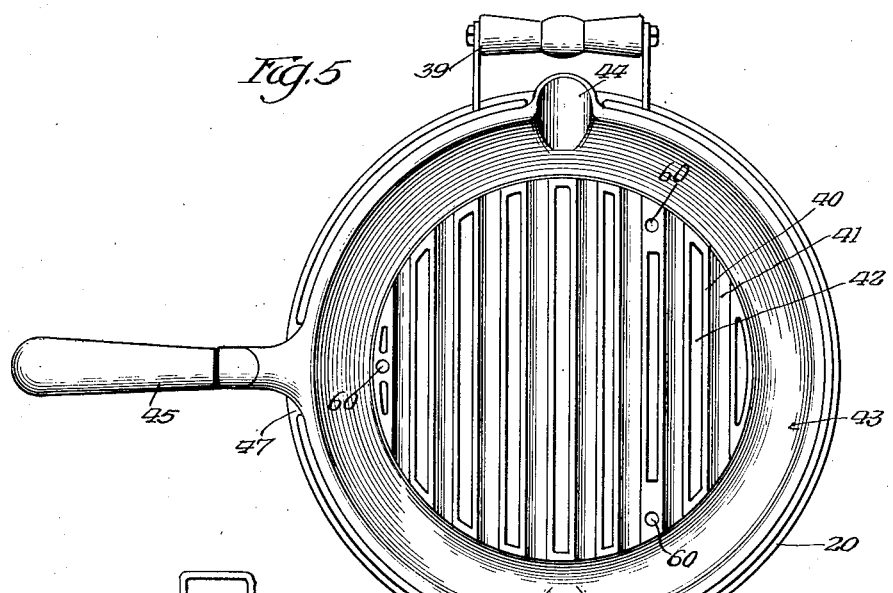
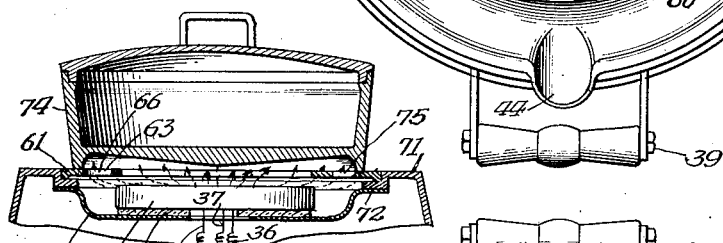
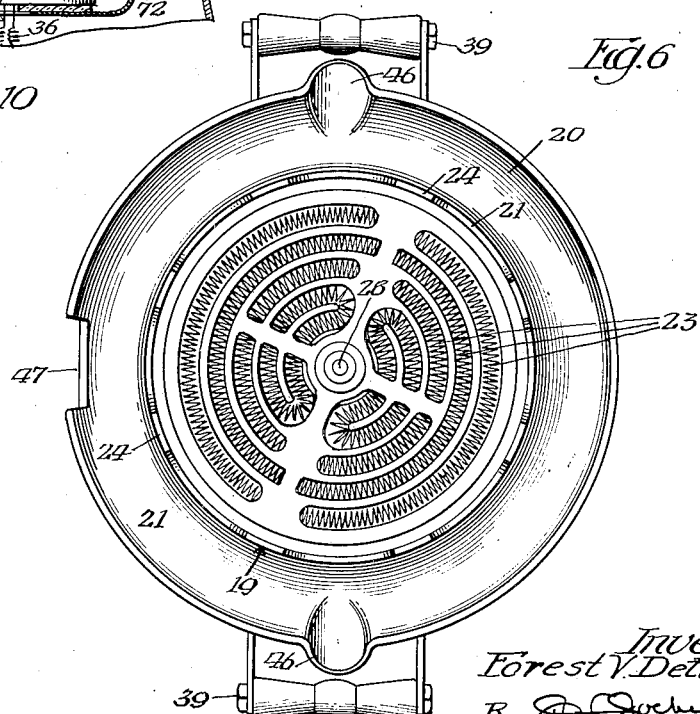
Inventor
Forest V. Detwiler

April 21, 1931. F. V. DETWILER 1,802,005
COOKING APPARATUS
Filed Dec. 8, 1928 3 Sheets-Sheet 3
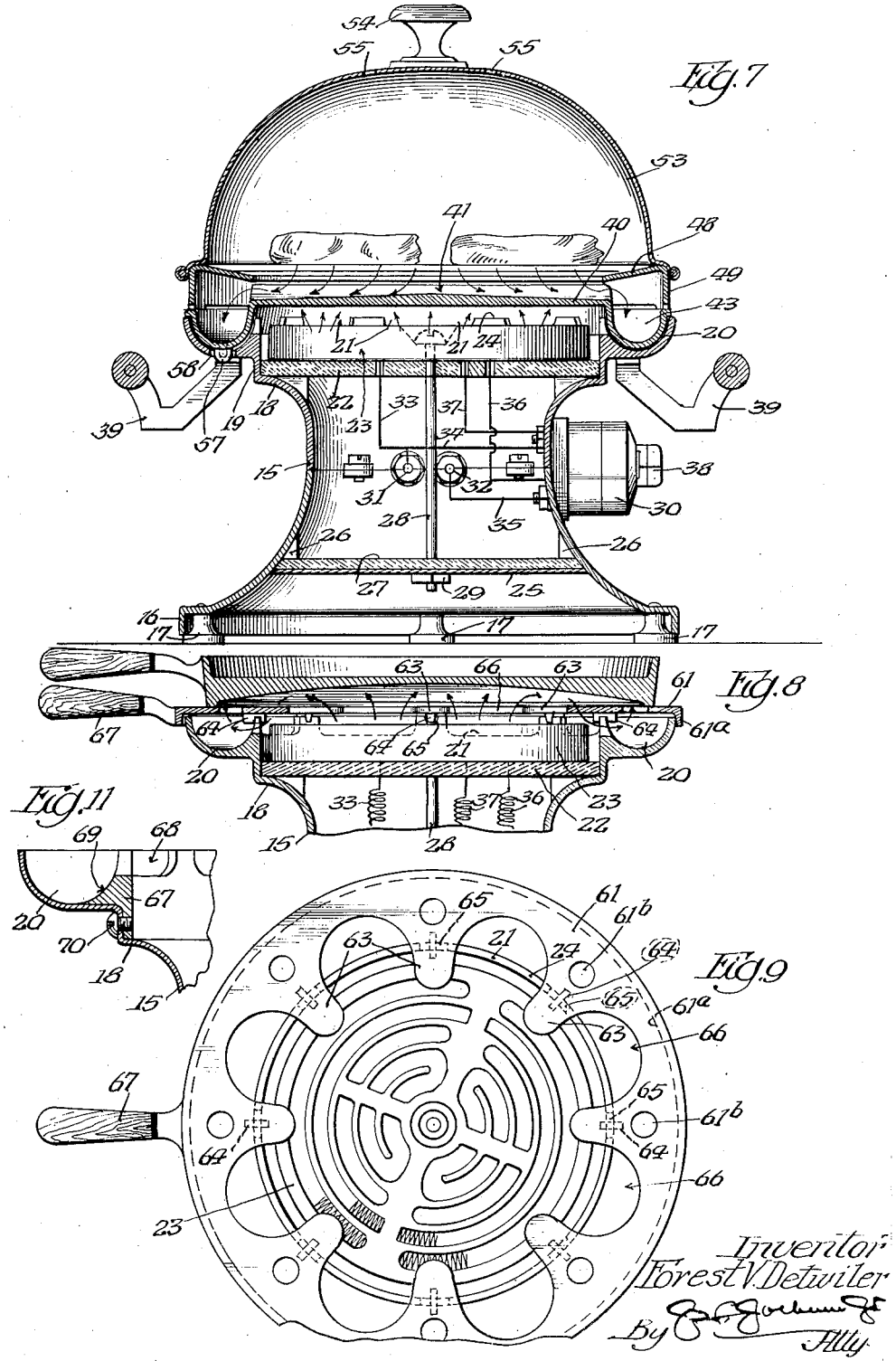

Patented Apr. 21, 1931

1,802,005

UNITED STATES PATENT OFFICE

FOREST V. DETWILER, OF CHICAGO, ILLINOIS

COOKING APPARATUS

Application filed December 8, 1928. Serial No. 324,743.

This invention relates to improvements in cooking apparatus of the type in which a heating unit is combined with a supporting base and with which unit a plurality of cooking elements may be employed in combination with each other, or singly, or interchangeably.

In my Patent Number 1,614,661, issued January 18, 1927, there is shown and described a cooking apparatus of this general type.

It has been found in practice that frequently, and owing to the fact that the handles of the cooking elements project for a considerable distance beyond the element, they are frequently struck by the hand or arm of the operator, with the result that the elements become tilted with respect to the supporting base, and also with respect to each other, and frequently become displaced therefrom, causing considerable annoyance and oftentimes damage.

It is one of the objects of the present invention to overcome these difficulties and objections and to provide improved means for maintaining the cooking elements against such displacement, but permitting them to be readily separated or removed together or separately from the supporting base.

A further object is to provide improved means for maintaining the cooking elements against separation or displacement one with respect to the other, due to the contraction and expansion of the parts.

A further object is to provide an improved heat distributor plate or element adapted to be readily applied to the apparatus for causing a substantially equal distribution of the heat delivered from the element, and as readily removed therefrom, and improved means for insuring the proper positioning of such plate with respect to the heating element.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a side elevation of an improved cooking apparatus of this character constructed in accordance with the principles of this invention.

Figure 2 is a view taken on line 2—2, Figure 1, with parts omitted and parts broken away.

Figure 3 is an enlarged detail sectional view taken on line 3—3, Figure 2.

Figure 4 is an enlarged detail sectional view taken on line 4—4, Figure 2.

Figure 5 is a top plan view of the base and heating element with one form of food supporting element attached thereto.

Figure 6 is a top plan view of the base member and heating unit.

Figure 7 is a vertical sectional view taken on line 7—7, Figure 1.

Figure 8 is a vertical sectional view of the upper portion of the supporting base with the heat unit in place and showing a heat distributor plate applied thereto.

Figure 9 is a top plan view of Figure 8.

Figure 10 is a modified form of the invention.

Figure 11 is a detail view of a portion of the supporting base, showing the manner in which it may be formed of a stamping.

Referring more particularly to the drawings the numeral 15 designates a supporting base which may be of any desired size and configuration and constructed of any suitable material, but is preferably constructed of metal and is hollow, being provided with a depending flange 16 at its base and supporting feet or legs 17 within the flange.

The upper portion of the base is provided with a circumferential shoulder 18 therein having an upwardly projecting peripheral flange 19 encompassing the shoulder and projecting laterally from the flange is a trough 20, the inner wall of which trough is formed by the upper portion of the flange 19 and which inner wall is cut away or provided with openings 21, for a purpose to be set forth.

Within the base and resting upon the shoulder 18 is a support 22 of any suitable insulating material and upon this support 22 a heating element 23 is arranged. The heating element is of a height that the upper surface thereof will be disposed below the upper surface 24 of the flange 19 and the upper surface of the flange 24 serves as a support upon which an article may rest. When the apparatus is used in this manner the openings 21 in the flange 19 provide passages for the circulation of air currents.

Extending across the base 15 and above the bottom thereof is a plate 25 which rests against shoulders 26 within the base, insulating material 27 being provided, if desired, between the plate 25 and the shoulders 26 to prevent the heat radiated by the heater from contacting with the surface upon which the base rests.

The support 22 and the plate 25 together with the insulating material 27, and if desired the element 23, may be secured together preferably by means of a rod 28 having on its lower end an adjustable nut or collar 29.

Supported by the base is a switch device 30 of any approved construction and contact terminals 31—32 are provided by means of which the heater 23 may be connected to any suitable source of supply of current.

Leading from the element 23 to the contact 31 is a conductor 33 and a branch conductor 34 leads from the conductor 33 to the switch 30. A conductor 35 leads from the contact terminal 32 also to the switch. A conductor 36 leads from the heating element 23 to one of the contacts of the switch 30, and another conductor 37 leads from the heating element 23 to another contact in the switch 30, so that when the button 38 of the switch 30 is actuated, the degree of heat supplied by the heating element 23 may be controlled by cutting in or cutting out the desired amount of resistance, as is usual in devices of this character.

Handles 39 may be provided upon the base by means of which it may be transported.

The numeral 40 designates generally what might be termed a drip member which is provided with gutters or channels 41 extending across the top thereof, and intermediate the adjacent channels are slots or openings 42 which are substantially co-extensive with the channels. The member 40 is provided with a trough 43 extending about its periphery and portions of the wall of the trough may be shaped to form spouts 44, a handle 45 being connected to the drip element by means of which it may be transported.

The wall of the trough 20 may also be shaped to form portions 46 into which the spouts 44 may be seated when the drip element 40 is placed upon the base and the drip element is of such a size that the trough 43 will rest within the trough 20 and the trough 43 is of a configuration to fit therein. The wall of the trough 20 may also be provided with a cut away portion 47 for the reception of the handle 45.

The body portion of the drip element 40 may be of any desired height so that when the trough 43 rests in the trough 20 the body of the drip element will be supported above the heating element.

A food supporting member designated generally by the reference numeral 48 is also provided to co-operate with the drip member 40. This member 48 has a depending circumferential flange 49, and spaced ribs 50 which extend thereacross. The lower faces of the ribs 50 are recessed as at 51 and the ribs 50 are so arranged that when the food supporting member 48 is in position they will stand over the openings 42 and are spaced slightly thereabove, the spaces 52 between the ribs 50 being disposed above the trough 41 so that the juices from the food being cooked will flow into the troughs 41 while the heat will flow through the openings 42.

From the trough 41 the juices will flow into the circumferential groove or trough 43 in the member 40.

A cover 53 may be provided which is adapted to be placed over the food supporting member and the cover is provided with a suitable handle 54 and also with openings 55 through which vapor may pass.

It has been found that as the handle 56 which is secured to the food supporting member 48, together with the handle 45 on the drip member 40 project for a considerable distance they are oftentimes struck by the hand or arm of the operator, causing them to tilt with respect to the supporting base.

In order to overcome these objections the drip member 40 may be provided with projections 57 preferably depending below the bottom of the trough 43 and these projections are adapted to enter suitable openings 58 in the bottom of the trough 20. Any number of these projections 57 and openings 58 may be provided and the projections will be of such a length and of such a size with respect to the openings 58 that the member 40 cannot become accidentally dislodged with respect to the trough 20 without raising the member 40 in a vertical plane.

In order to prevent the food supporting member 48 from tilting with respect to the drip member, the member 48 is provided with any number of depending projections 59 which are adapted to enter suitable openings 60 in the drip member 40. These openings 60, any number of which may be provided, preferably three, are arranged in a solid portion of the member 40, as shown more clearly in Figure 5, and the projections 59 may extend below certain of the ribs 50.

These projections 59 and 60 not only prevent the member 48 from tilting but will prevent the member 48 from being displaced with respect to the drip member 40 due to contraction and expansion of these parts as the member 48 will rise and fall to a certain extent with respect to the drip member 40, due to contraction and expansion of the parts by heat.

As a means for distributing the heat or flame throughout the area of the bottom of the receptable which may be placed upon the surfaces 24 of the walls of the base, a heat distributor plate 61 may be provided having a central opening therethrough, and portions 63 of the plate 61 project inwardly into the opening and are spaced from each other. These projections 63 may be of any desired length from the periphery of the member and depending from the lower face thereof are extensions or lugs 64 which are adapted to enter openings 65 in the surfaces 24 of the portions of the flange 19 intermediate the openings 21 so as to insure a registration of the portions 66 of the central opening with the openings 21 in the flange 19 of the supporting base.

The cooking utensil is placed upon the plate 61 and inasmuch as the portions 66 extend to points adjacent the periphery of the plate 61 and as they register with the openings 21 in the flange 19, it will be manifest that the circulation of the heat will not be impaired and the heat will be directed over a greater area of the bottom of the utensil. Furthermore, the heat distributor plate 61 will not interfere with the circulation of air currents.

A handle 67 is provided on the member 61 by means of which it may be manipulated.

By the provision of the lugs 64 and the openings 65 in the flange 19 the plate 61 will be properly positioned and these cooperating parts will insure a placing of the plate 61 so that the openings 21 and 66 will always register.

Furthermore, with this construction the heat distributor plate 61 will be always maintained at an elevation above the heating element and the supply of air as well as the circulation of the heated air currents will not be impaired.

The plate 61 is preferably of a diameter slightly greater than the external diameter of the trough 20 and a depending flange 61ª may be provided on the plate which engages over the edge of the outer wall of the trough 20.

In Figure 11 the supporting base 15 may be formed of a stamping of sheet material and when so constructed the shoulder 18 is formed in the body portion thereof and the outer wall of the trough 20 is formed integral with the base. A separate annular element 67 having openings 68 through the top of its wall may be provided to set within the base and to rest upon the shoulder 18, the inner wall 69 of the trough 20 constituting a portion of the element 67. The element 67 may be secured in position in any suitable manner, such as by means of fastening devices 70 in the form of screws or the like.

As shown in Figure 10, the supporting structure 71 may be provided with an opening through the top thereof having a portion 72 forming an annular flange and which flange is spaced below the top of the element 71. Another supporting member 73 of any suitable material may be secured to the bottom of the flange 72 so as to form a support for the heating element 23, the insulating material 22 being preferably provided between the element 23 and the supporting member 73. The supporting member 73 is so positioned that the top of the heating element 23 will be disposed preferably below the upper surface of the flange 72 and in this form of the invention the heat distributor plate 61 is placed upon the flange 72 so that the upper surface of the plate will be substantially flush with the upper surface of the supporting element 71 so that when the cooking vessel 74 is placed upon the distributor plate 61 the heat from the element 23 will by reason of the central opening and the openings 66 communicating therewith in the plate 61, be directed to all parts of the bottom of the cooking vessel.

In the form of the invention shown in Figure 10, the handle is omitted from the heat distributor plate 61 and the plate may be lifted from its position upon the support 71 in any suitable manner, such as by means of an ordinary lifter adapted to be inserted in an opening 75 in the plate 61.

While the preferred forms of the invention have been herein shown and described, it is to be understood that various changes may be made in the details of construction and in the combination and arrangement of the several parts, within the scope of the claims, without departing from the spirit of this invention.

What is claimed as new is:—

1. A cooking apparatus embodying a base, a heating unit mounted thereupon, a supporting flange encompassing said element, said flange having recesses therein opening through the upper face thereof, a drip member extending across said element and having a portion shaped to engage and rest upon said flange, projections depending from said flange engaging portion of the drip member and adapted to enter said recesses, and a food supporting member removably supported by an extending across said drip member.

2. A cooking apparatus embodying a base, a heating unit mounted thereupon, a supporting flange encompassing said element, said flange having recesses therein opening through the upper face thereof, a drip member extending across said element and having a portion shaped to engage and rest upon said flange, projections depending from said flange engaging portion of the drip member and adapted to enter said recesses, and a food supporting member removably supported by and extending across said drip member, said flange being of a trough shape formation and the said flange engaging portion of said drip member being of a configuration to fit within and conform to the contour of said trough.

3. A cooking apparatus embodying a base, a heating unit mounted thereupon, a supporting flange encompassing said unit, said flange having recesses therein opening through the upper face thereof, a drip member extending across said element and having a portion shaped to engage and rest upon said flange, projections depending from said flange engaging a portion of the drip member and adapted to enter said recesses, a food supporting member removably supported by and extending across said drip member, and a handle secured to and projecting beyond the periphery of said drip member.

4. A cooking apparatus embodying a base, a heating unit mounted thereupon, a drip member supported by the base and extending across the heating unit, a food supporting member detachably mounted and extending across the drip member, there being openings in said drip member, and projections depending from the food supporting member and entering and fitting within said openings whereby said food supporting member will be maintained against tilting movement with respect to the said drip member.

5. A cooking apparatus embodying a base, a heating unit mounted thereupon, a drip member supported by the base and extending across the heating unit, a food supporting member detachably mounted and extending across the drip member, there being openings in said drip member, and projections depending from the food supporting member and entering and fitting within said openings whereby said food supporting member will be maintained against tilting movement with respect to the said drip member, said projections and openings serving to permit the said food supporting member to have a free movement in a vertical plane with respect to the said drip member.

6. A cooking apparatus embodying a base, a heating unit mounted thereupon, a drip member supported by the base and extending across the heating unit, a food supporting member detachably mounted and extending across the drip member, there being openings in said drip member, and projections depending from the food supporting member and entering and fitting within said openings whereby said food supporting member will be maintained against tilting movement with respect to the said drip member, the said projections being spaced from the periphery of said food supporting member and from each other.

7. A cooking apparatus embodying a base, a heating element supported thereby, a gutter on the base and encompassing said element, a cooking element adapted to extend across said heating element, a trough connected with said cooking element, said trough depending below the cooking element and adapted to fit within said gutter, a spout formed in the wall of said trough, and a recess in the wall of said gutter for the reception of said spout when said cooking element is in position upon said base.

8. A cooking apparatus embodying a base, a heating element supported thereby, a gutter on the base and encompassing said element, a cooking element adapted to extend across said heating element, a trough connected with said cooking element, said trough depending below the cooking element and adapted to fit within said gutter, and a projecting handle on said cooking element, there being an open recess in the wall of said gutter for the reception of a portion of said handle when said cooking element is in position upon said base.

9. A portable cooking apparatus embodying a hollow base, a supporting shoulder within, adjacent but spaced from the top thereof, an insulating support resting upon said shoulder within the base and extending thereacross, a heating element mounted upon said support and disposed below the top of the base, a heat insulated shield extending across the base adjacent but spaced from the bottom thereof to form with the said support a closed chamber within the base, means for controlling said element, and a cooking element detachably connected with the base and extending across said heating element.

10. A portable cooking apparatus embodying a hollow base, a supporting shoulder within, adjacent but spaced from the top thereof, an insulating support resting upon said shoulder within the base and extending thereacross, a heating element mounted upon said support and disposed below the top of the base, a heat insulated shield extending across the base adajcent but spaced from the bottom thereof to form with the said support a closed chamber within the base, means for controlling said element, and a plurality of interchangeable elements adapted to be detachably connected with said base to extend across said heating element.

In testimony whereof I have signed my name to this specification, on this 27th day of December, A. D. 1927.

FOREST V. DETWILER.